Jan. 12, 1926.  S. E. LEONARD, JR  1,569,380
GEOMETRICAL LOCATION FINDER FOR NAVIGATORS
Filed April 11, 1921    2 Sheets—Sheet 2

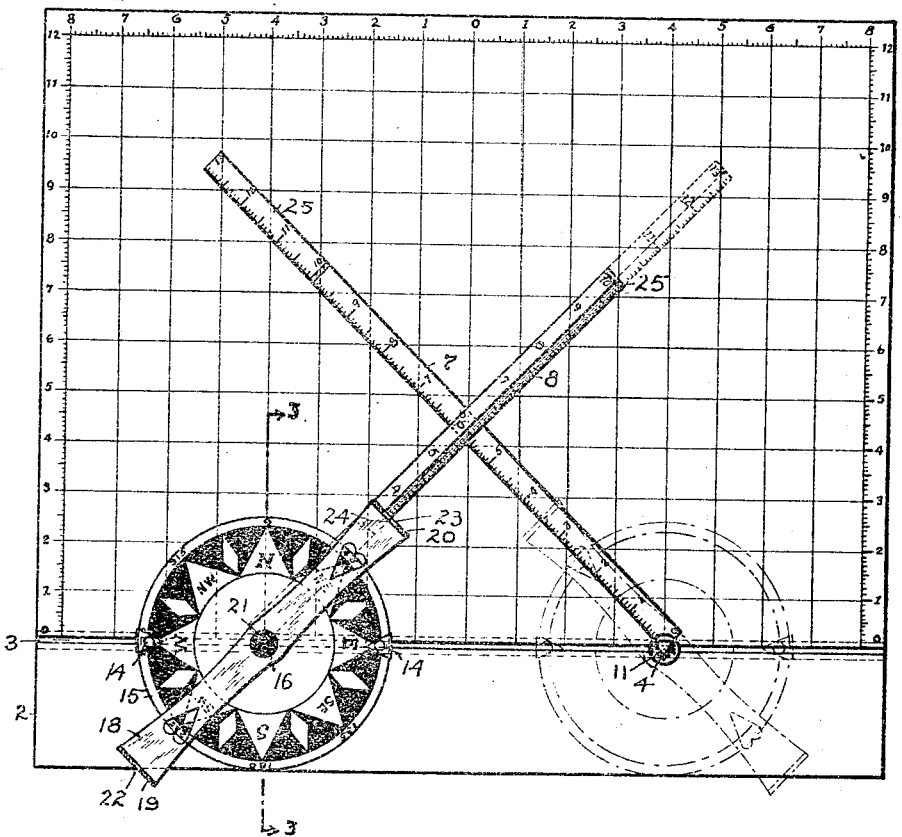
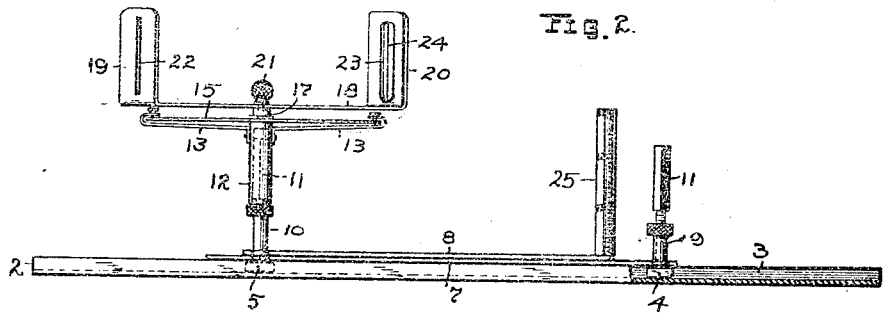

Inventor
S. E. Leonard Jr.

By Fisher & Moest
Attorneys

Patented Jan. 12, 1926.

UNITED STATES PATENT OFFICE.

SAMUEL E. LEONARD, JR., OF EAST CLEVELAND, OHIO.

GEOMETRICAL LOCATION FINDER FOR NAVIGATORS.

Application filed April 11, 1921. Serial No. 460,249.

*To all whom it may concern:*

Be it known that I, SAMUEL E. LEONARD, Jr., a citizen of the United States, residing at East Cleveland, in the county of Cuyahoga and State of Ohio, have invented certain new and useful Improvements in a Geometrical Location Finder for Navigators, of which the following is a specification.

This geometrical instrument has been evolved especially for pilots or navigators of ships, being in a broad sense a location finder, or in other words, an instrument which will enable a pilot or navigator to make quick and accurate calculations and measurements of the distances that his ship may safely pass or is from a given point, object or station, and the distances it must travel before passing, or has traveled after passing, the point, object or station. The instrument is designed to save time and work for the pilot of the ship and to expedite the making of calculations and findings without his leaving the lookout station on the ship.

Figure 3:
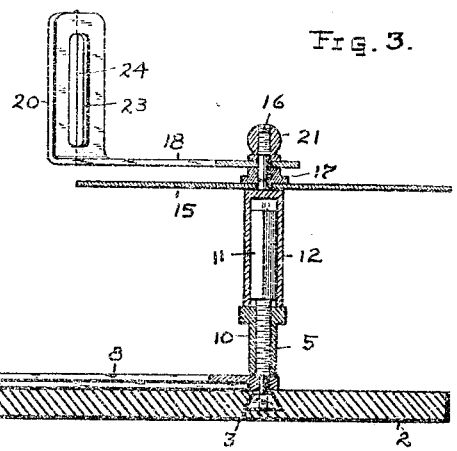
Figure 4:
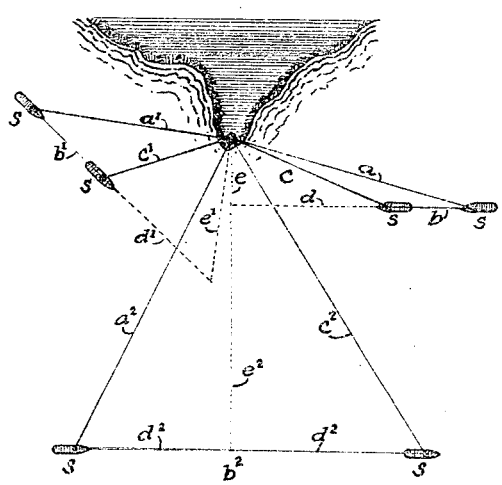
Figure 5:
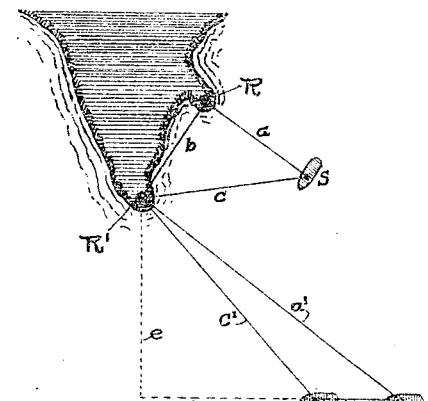
Figure 6:
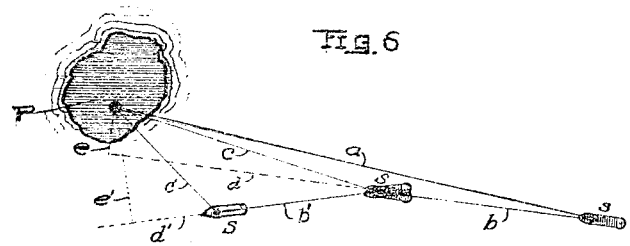

A top or plan view of the instrument is shown in Fig. 1 of the drawings accompanying this application, and Fig. 2 is a front elevation thereof, the table being shown partly in section. Fig. 3 is a vertical section on an enlarged scale of a part of the instrument, on line 3—3 of Fig. 1. Figs. 4, 5, and 6 are diagrams illustrating the application and use of the instrument under varying conditions.

The instrument comprises a table 2 which is ruled off in squares as shown in Fig. 1. At one end of table 2 is a groove or slot 3 paralleling the horizontal lines of the squares and defining the base line marked zero. Two separate posts 4 and 5, respectively, are slidably confined within slot 3, which is rabbeted or beveled to hold the enlargement at the bottom end of each post, and two calibrated scales or straight-edged blades 7 and 8, respectively, are pivotally sleeved upon said posts and adapted to be turned to different angular positions over the table in respect to each other and the marked squares. Each post and scale is adjustable lengthwise of slot 3 and may be clamped wherever adjusted by turning thumb nuts 9 and 10 on said posts respectively. In this way the pivot ends of the two scales may be separated more or less, and when the scales are turned to cross each other over the table a triangle is formed within the borders of slot 3 and the scales 7 and 8, the slot providing the base and the scales forming the other two sides of the triangle. In so doing the apex of the triangle will be located opposite some point on the line or within one of the squares on the table and which squares may be calibrated in fractions of inches, preferably tenths, to represent one mile or any given distance to each inch. The numerals representing such miles or distances are marked opposite the lines at each vertical border edge of the table, and also at the end border edge beginning at each side of a vertical median line on the table.

Each pivot post 4 and 5 has a triangular or flat-sided extension 11 at its upper end over which a tubular post or shank 12 may be sleeved for quick and convenient attachment and detachment. This tubular shank 12 has integral or rigid arms 13 extending laterally therefrom which carry binding screws 14 at their bent extremities wherewith to lock or clamp a round disk or compass card 15 in a horizontal position centrally above the pivot post 11. Each tubular post has a reduced extension 16 adapted to center the compass card and around which the compass card may be rotated in effecting adjustments of the card by points or degrees to the ships head. In use, the compass card is first adjusted to the ships head and then every bearing or sight secured thereafter with the instrument is according to the ships own compass. This enables the navigator to make note in the log of the ship of the actual bearing of the point as read from this instrument.

A collar or washer 17 is sleeved upon reduced extension 16 and rests upon the compass card; and a sighting device consisting of a flat bar or blade 18 having its opposite extremities 19 and 20 bent upwardly and perpendicularly at right angles to the blade is rotatably mounted upon the washer or collar 17 in connection with the extension of post 12, and locking of this sight member in any given angular position is effected by a thumb nut 21. A narrow sight opening 22 is provided vertically within the bent extremity 19, and a larger sight opening 23 with a fine sight-wire 24 is provided with the other bent extremity 20 so that an observer may take a sight upon any distant point or object at any angle across the board and directly in line with the axis of the pivot post upon which the sight is temporarily mounted. When the proper angle is established the sight blade 18 is clamped against rotation, and the particular scale which is pivotally connected with that particular post upon which the sight is temporarily mounted is then turned parallel and lined up with the sight openings and finally clamped in a fixed position by means of the thumb screw associated therewith at the bottom of the post. To facilitate the lining up of the scale with the sight blade, I have made each scale in two sections and have hinged the sections together to permit the outer section of free end 25 to be turned upwardly so that an observer may sight through openings 22 and 23 and observe and line up the edge of the scale with the sight wire 24. When this has been accomplished the hinged section 25 of the scale may be turned down into a flat rest position upon the table.

In using the instrument aboard ship, as in finding the distance the ship is off any land mark or other stationary object, the compass card and the sight members are mounted upon the first post from which a sight is to be taken and the post locked within slot 3. The board is then held in a horizontal plane with the slot 3 pointing at and parallel with the ships head, and a sight or bearing is then taken upon the land mark or object. The scale connected with that post is then adjusted and clamped in line with the sight thus obtained. When the ship has traveled a given distance on a straight course and is a known factor this distance is laid out as the distance between the two pivot posts, and the second post adjusted accordingly and the compass card and sight member are bodily transferred to this second post and a second sight obtained on the same land mark or object and the second scale lined up with the sight member. This places the said scales in crossing relation and the triangle defined by the crossed scales and slot 3 will give the navigator several readings. Thus, the distance traveled by the ship from the first point of reading to the second reading will be shown by the number of squares between the two pivot posts; the distance of the ship where the ship will pass or has passed abreast of the object, will be shown by the number of squares between the apex and the base of the triangle; the distance of the ship between the place of taking the first sight and the object itself will be shown on the scale with which the first sight has been marked, reading from its post to the point of intersection with the second scale; the distance of the ship from the object as sighted on the second reading will be shown on the second scale, reading from the second pivot post to the point or intersection with the first scale or ruler; and the distance that the ship must travel to come abreast of the object is shown by the number of squares between the first sighting post and the perpendicular line of the triangle which meets or intersects the apex of the triangle.

To further exemplify the objects and advantages of my invention, I show in Figs. 4 to 6 several diagrams illustrating different courses of a ship in respect to a land mark and a series of different readings taken with the instrument in navigating the ship. In Fig. 4, the triangle marked in full lines by $a$, $b$ and $c$, has been obtained by sighting the instrument as hereinbefore described as the ship approaches a point abreast of the land mark, and the navigator is enabled to read upon the instrument itself the distances represented by the full lines of the triangle, the distance $b$ being a known factor and the estimated distance the ship has traveled, and also the distances represented by the dotted lines 3 and $d$ of the right triangle, thereby determining in advance the exact distance the ship S will pass abreast of the land mark. A ship steering a different course past the land mark or light is illustrated by the oblique-angled triangles marked $a'$, $b'$, $c'$, and the lines $d'$ and $e'$, and a still different course of a ship S is outlined by the triangle marked $a^2$, $b^2$, $c^2$, and the lines $d^2$, and $e^2$.

The instrument can also be used advantageously in conjunction with the radio compass stations which the Government has established to aid navigators in fixing their bearings by wireless signals.

For example, where bearings are secured from two radio compass stations R, R' as delineated in Fig. 5, the instrument is used in the following manner: The distance between the radio compass stations and their bearing to each other is "given data," that is, it is known. This distance is laid out on the base slot, that is, the posts are set apart a corresponding distance on the line of slot 3 and the compass card is adjusted to the number of degrees which these stations bear to each other which places the base of the instrument parallel with the line between the stations. The sight member is then adjusted to the correct bearing as furnished to the radio operator on the ship from the radio compass station on the shore. The corresponding scale is then lined up with the sight member and fixed in that position. The compass card and the sight member are then shifted to the other post and its scale and a correct bearing established from a signal given to the ships radio operator by the radio compass station on shore. The sight member is then adjusted and the second scale lined up with the sight member which will place it across the other scale. In this way a triangle $a$, $b$ and $c$, Fig. 5 and definite readings are obtained giving distance of the ship off either radio compass station.

Where only one radio compass station is available to give a bearing, the compass card is set to the ships true course and the bearing secured by the ships radio operator from the shore station and laid out on the instrument with the aid of the sight member and the rear or "after" scale lined up with the sight member. The pivot post of the second or "forward" scale is then adjusted along the slot to correspond to the distance which the ship is to run between two bearings. The second bearing is then secured from the radio operator, which is laid out by the sight member now placed over the second scale post. This scale is then lined up with the sight member and the two scales will then intersect and define a triangular over the squares. Assuming such bearings to have been taken and the triangle $a'$, $b'$, $c'$, and the lines $e$, $d$, of Fig. 5 to be the example: The first scale 7 will define line $a'$ and where this scale intersects scale 8 it will denote by its own graduated marks the distance between the ship and the station at the time of the receipt of the first bearing; the second scale will mark line $c'$ and give the distance between the ship and station at the receipt of the second bearing; and the number of squares on the board on line $e$ between the point of intersection of the scales and the base of the triangle $d$—$b'$ will give the distance the ship will pass abreast of the radio compass station. The distance to run before coming abreast is shown by the squares on line $d$.

Fig. 6, illustrates an example of a ship S proceeding on a course which will bring it too close to the point or shoal P and when this has been determined by the instrument by the triangle $a$, $b$ and $c$, the ships course is changed to course $b'$ and other sights taken on lines $c$ and $c'$ to establish the distance the ship may pass safely abreast the point as indicated by dotted lines $e'$ and $d'$.

What I claim is:

1. A geometrical location finder for navigators, comprising a ruled table and a pair of posts independently adjustable in a straight line thereon, separate blades mounted for independent rotation on said posts, respectively, and a compass card and sighting device and means mounting said card and sighting device whereby they may be detachably mounted for independent rotational movement upon either post.

2. A geometrical location finder for navigators, comprising a ruled table having a slot therein and a pair of posts adapted and having means whereby said posts may be adjusted and fixed in desired spaced relation in said slot, scales each pivotally connected with its respective post, and means adapted to be detachably connected with either post alternatively, comprising a rotatable compass card and a separate sighting member surmounting said compass card.

3. A geometrical measuring instrument, comprising a table having cross-sections ruled thereon in squares and provided with a slot paralleling one of said rulings, separate pivot posts each slidably mounted within said slot, scales each pivotally connected with its respective post above for pivotal movement over said table, a compass card and means adapted to mount the same rotatably upon the axis of either one of said posts, and a sighting member rotatably mounted above and upon the same axis as said compass card.

4. A geometrical location finder for navigators, comprising a graduated table having a straight slot therein, a pair of triangle marking members pivotally mounted on separate posts each of which is adapted to slide in said slot, clamping means for securing each post to the table, and a compass card adapted to be removably and interchangeably affixed to either of said pivot posts.

5. A geometrical location finder for navigators, comprising a table having graduated rulings and a slot adjacent said rulings, a set of blades each having a pivot post mounted to slide independently in said slot to permit different triangular figures to be indicated in association with said graduated rulings, and an interchangeable compass card for alternative attachment with said pivot posts.

6. A geometrical location finder for navigators, comprising a graduated table having a set of posts mounted to slide thereon, calibrated blades pivotally connected with said posts, a member sleeved upon one of said posts having screws and fastening devices for holding a compass card and a sighting device, and a sighting device and an adjustable compass card adapted to be affixed to said member and to be shifted therewith to said pivot posts alternatively for setting said blades in different angular position above said graduated table.

7. A geometrical location finder for navigators, comprising a ruled table having a slot therein and a pair of posts having flat sided extensions for holding an attachment device, clamping means whereby said posts may be adjustably mounted and fixed in spaced relation in said slot, separate calibrated blades pivotally connected with said posts, an attachment device adapted to be sleeved upon either post extension, a rotatable compass card and a separate sighting member surmounting said compass card, and means for fastening said card and sighting member for independent rotation upon said attachment device.

8. A geometrical location finder for navigators, comprising a ruled table having a straight guide, separate pivot posts and means adapted to clamp said posts independently in different spaced positions lengthwise of said straight guide, separate scaled blades pivotally connected with the base part of said posts, respectively, a compass card and a sighting device having clamping means adapted to secure said card and device in rotatable adjustable position one above the other, and a supporting member for said card and device adapted to be sleeved upon the upper part of either post.

9. A geometrical measuring instrument, comprising a table having cross-section ruling thereon in squares and provided with a slot paralleling one of said rulings, separate pivot posts each having a triangular extension at its upper end and a base part slidably mounted within said slot, a pair of scales each pivotally connected with the base part of its respective post above said table, a compass card, a sleeve adapted to fit the extension of either post having means adapted to mount said card rotatably thereon, and a sighting member rotatably mounted above and upon the same axis as said compass card.

Signed at Cleveland, in the county of Cuyahoga, and State of Ohio, this 24th day of March, 1921.

SAMUEL E. LEONARD, Jr.